US009445461B2

United States Patent
Shimasawa et al.

(10) Patent No.: US 9,445,461 B2
(45) Date of Patent: Sep. 13, 2016

(54) METHOD OF PRODUCING A HIGH-FREQUENCY HEAT TREATMENT COIL

(71) Applicant: NTN CORPORATION, Osaka (JP)

(72) Inventors: Takeshi Shimasawa, Shizuoka (JP); Shintaro Suzuki, Shizuoka (JP); Atsushi Tokuda, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/350,638

(22) PCT Filed: Nov. 2, 2012

(86) PCT No.: PCT/JP2012/078459
§ 371 (c)(1),
(2) Date: Apr. 9, 2014

(87) PCT Pub. No.: WO2013/065818
PCT Pub. Date: May 10, 2013

(65) Prior Publication Data
US 2014/0246423 A1    Sep. 4, 2014

(30) Foreign Application Priority Data

Nov. 4, 2011    (JP) ................................ 2011-242399
Oct. 26, 2012    (JP) ................................ 2012-236833

(51) Int. Cl.
*H01F 7/06*    (2006.01)
*H05B 6/42*    (2006.01)
(Continued)

(52) U.S. Cl.
CPC *H05B 6/42* (2013.01); *C21D 1/10* (2013.01); *C21D 1/42* (2013.01); *C21D 9/28* (2013.01);
(Continued)

(58) Field of Classification Search
CPC ........ H01F 7/06; H01F 41/00; H01F 41/042; H01F 27/00; H01R 31/00; H01R 31/66; H05K 3/00
USPC ......... 29/602.1, 605–607; 336/83, 212, 234; 361/760–766
See application file for complete search history.

(56) References Cited

U.S. PATENT DOCUMENTS 4,705,580 A * 11/1987 Yamazaki ................ B21F 3/02
                                                          148/568
4,987,675 A *  1/1991 Jackson .................... H05B 3/10
                                                          219/546
(Continued)

FOREIGN PATENT DOCUMENTS

CN    1630786    6/2005
JP    7-36395    2/1995
(Continued)

OTHER PUBLICATIONS

Extended European Search Report issued May 19, 2015 in corresponding European Application No. 12845154.9.
(Continued)

*Primary Examiner* — Paul D Kim
(74) *Attorney, Agent, or Firm* — Wenderoth, Lind & Ponack, L.L.P.

(57) ABSTRACT

A method is provided to produce a high-frequency heat treatment coil including a heating section for heating a heat treatment portion of an outer joint member for a constant velocity universal joint. The heating section is formed by machining in an integrated manner, and is joined to another section to complete the high-frequency heat treatment coil.

2 Claims, 14 Drawing Sheets

(51) Int. Cl.
  *H05B 6/10* (2006.01)
  *H05B 6/36* (2006.01)
  *F16D 3/205* (2006.01)
  *F16D 3/223* (2011.01)
  *F16D 3/18* (2006.01)
  *H01F 41/04* (2006.01)
  *C21D 1/10* (2006.01)
  *C21D 9/28* (2006.01)
  *C21D 1/42* (2006.01)
  *C21D 9/08* (2006.01)

(52) U.S. Cl.
  CPC .............. *F16D 3/18* (2013.01); *F16D 3/2055* (2013.01); *F16D 3/223* (2013.01); *H01F 41/04* (2013.01); *H05B 6/101* (2013.01); *H05B 6/36* (2013.01); *C21D 9/08* (2013.01); *F16D 2250/00* (2013.01); *F16D 2300/10* (2013.01); *Y02P 10/253* (2015.11); *Y10T 29/4902* (2015.01); *Y10T 29/49073* (2015.01)

(56) References Cited

U.S. PATENT DOCUMENTS

| | | | | |
|---|---|---|---|---|
| 5,062,786 A | * | 11/1991 | Arai | B29C 45/73 264/486 |
| 5,553,443 A | * | 9/1996 | St. Clair | B68G 9/00 53/438 |
| 5,572,853 A | * | 11/1996 | St. Clair | B68G 9/00 53/114 |
| 8,101,197 B2 | * | 1/2012 | Buiser | A61B 17/12022 424/422 |
| 2004/0264821 A1 | | 12/2004 | Budde | |
| 2012/0211125 A1 | | 8/2012 | Yoshida et al. | |

FOREIGN PATENT DOCUMENTS

| | | |
|---|---|---|
| JP | 7-226292 | 8/1995 |
| JP | 11-26148 | 1/1999 |
| JP | 2003-96516 | 4/2003 |
| JP | 2007-262461 | 10/2007 |
| JP | 2009-218176 | 9/2009 |
| JP | 2010-86904 | 4/2010 |
| JP | 2011-94700 | 5/2011 |

OTHER PUBLICATIONS

International Preliminary Report on Patentability and Written Opinion of the International Searching Authority issued May 15, 2014 in International (PCT) Application No. PCT/JP2012/078459.

International Search Report issued Nov. 27, 2012 in International (PCT) Application No. PCT/JP2012/078459.

Chinese Office Action issued Apr. 21, 2015 in corresponding Chinese Patent Application No. 201280053370.0 with English translation.

* cited by examiner

METHOD OF PRODUCING A HIGH-FREQUENCY HEAT TREATMENT COIL

TECHNICAL FIELD

The present invention relates to a high-frequency heat treatment coil, an outer joint member for a constant velocity universal joint, and to a constant velocity universal joint.

BACKGROUND ART

In a constant velocity universal joint to be used in a power transmission device of automobiles and various industrial machines, a main portion includes an outer joint member 210, a tripod member 220 serving as an inner joint member, and rollers 230 as illustrated in FIGS. 14 and 15. One shaft (drive shaft) of two shafts on a drive side and a driven side to be connected extends integrally from a bottom portion of the outer joint member 210, and the other shaft (not shown) thereof is connected to the tripod member 220.

The outer joint member 210 has a bottomed tubular shape having one end opened, and three track grooves 212 extending in an axial direction are formed on an inner circumference of the outer joint member 210 at equal intervals in a circumferential direction. The tripod member 220 includes three leg shafts 224 protruding from a cylindrical boss section 222 to outside in a radial direction, and the leg shafts 224 are inserted in the track grooves 212 of the outer joint member 210 to be engaged with the track grooves 212 to transmit torque. The roller 230 is rotatably fitted externally to each leg shaft 224 through intermediation of a needle-shaped roller 240, and rolling of the roller 230 along a pair of opposed roller guide surfaces 214 of the track groove 212 smoothens angular displacement and axial displacement between the two shafts to be connected.

An outer circumferential surface of the leg shaft 224 forms an inner rolling surface of the needle-shaped roller 240, and an inner circumferential surface of the roller 230 forms an outer rolling surface of the needle-shaped roller 240. A plurality of needle-shaped rollers 240 are provided between the outer circumferential surface of the leg shaft 224 and the inner circumferential surface of the roller 230 in a full roller state.

Each of those needle-shaped rollers 240 is held in contact with an inner washer 250 externally fitted to a root portion of the leg shaft 224 on an inner side in a radial direction, and is held in contact with an outer washer 260 externally fitted to a tip end portion of the leg shaft 224 on an outer side in a radial direction. The outer washer 260 is retained by fitting a retaining ring 270 such as a round circlip to an annular groove 226 formed in the tip end portion of the leg shaft 224.

Metal components such as the outer joint member of the constant velocity universal joint as described above is subjected to thermal hardening treatment for enhancing strength. As the thermal hardening treatment, there is given high-frequency heat treatment. In the high-frequency heat treatment, a coil suitable for each product in terms of a product shape, quenching depth, a quenching range, and the like is to be used.

As the related art, there is given a metal tube made of copper or the like to be used as a high-frequency induction heating coil (JP 2010-86904 A). Such a metal tube is assembled by brazing a plurality of components made of copper with silver solder or the like.

Specifically, a high-frequency induction heating coil for an outer joint member of a tripod type constant velocity universal joint, as illustrated in FIG. 14, and the like, is obtained by forming a plurality of components illustrated in FIG. 12 and brazing them for assembly.

In this case, a coil 10 includes heating sections 1a, 1b, and 1c to be fitted into three track grooves. The heating sections 1a, 1b, and 1c are hollow so that cooling water is allowed to flow therethrough. That is, the respective heating sections 1a, 1b, and 1c include heating section bodies 2 in an inverted U-shape, connecting members 3a, 3b, 3c, and 3d for connecting lower ends of the heating section bodies 2, cover members 4a, 4b, and 4c for closing openings of upper wall sections of the heating section bodies 2, cover members 5a, 5b, 5c, and 5d for closing lower openings of the connecting members 3a, 3b, 3c, and 3d, and inner flanges 6a, 6b, and 6c connected to the upper wall sections of the heating section bodies 2. Therefore, the coil 10 includes a total of 17 components.

Further, as illustrated in FIG. 19, a fixed type constant velocity universal joint generally includes an outer joint member 303 in which a plurality of guide grooves (track grooves) 302 are formed on an inner surface 301 thereof in an axial direction, an inner joint member 306 in which a plurality of guide grooves (track grooves) 305 are formed on an outer surface 304 thereof, a plurality of balls 307 disposed in ball tracks formed by the cooperation of the track grooves 302 of the outer joint member 303 and the track grooves 105 of the inner joint member 306, and a cage 308 having pockets 309 for accommodating the balls 307.

In this case, as illustrated in FIGS. 16 and 17, a hardened layer 310 is formed on the inner surface 301 of the outer joint member 303 by high-frequency heat treatment or the like.

A coil 320 to be used for the high-frequency heat treatment is assembled by, for example, brazing a plurality of components made of copper with silver solder. That is, as illustrated in FIG. 18, the coil includes components including first and second members 311, 312 for forming a current passage of a high-frequency current, a connector 313 for connecting the first and second members 311, 312, a first cover member 314 for closing an opening of the first member 311, and a second cover member 315 for closing an opening of the second member 312. In this case, the respective components are formed of copper or the like and are joined by brazing or the like.

In the coil, a cooling water passage through which cooling water flows is formed. That is, the cross-section of the coil is formed into a tubular shape for reducing the influence of self-heating and radiation heat from a heated product, and during use, cooling water is constantly passed through a tube (cooling water passage). However, the coil may be damaged by a stress generated by repeating self-heating or heating with radiation heat and cooling with the passage of cooling water.

Then, there have been proposed various methods as a coil life improving method. That is, heating time is extended by lowering an output, or a coil shape is devised as shown by JP 7-226292 A, JP 7-36395 A, etc.

Technical Problem

In the case of brazing respective components formed with a copper material, for example, the components heated to 600° C. or more are brazed with silver solder. In this case, in order to fix the components and prevent deformation and distortion of the components by heating, it is preferred to assemble the components through use of a jig 11 as illustrated in FIG. 13. The jig 11 is formed of a tubular body having an inner diameter section corresponding to a mouth section inner diameter section of an outer joint member of a tripod type constant velocity universal joint serving as a member to be heated.

However, in the case of the coil 10 as illustrated in FIG. 12, the number of components is large, and the number of portions to be brazed is large. Therefore, even when the restraining jig 11 as illustrated in FIG. 13 is used, a skillful brazing technology and long operation time are required to entail high cost for performing assembly with high dimension accuracy.

Further, in the case of extending life by lowering the output to extend heating time period so as to reduce the load on the coil, there is a problem in that processing time period becomes longer to degrade productivity.

Further, in the case of extending life by devising the coil shape to reduce the load on the coil as described in JP 7-226292 A and JP 7-36395 A, the coil shape may become complicated, with the result that electrical matching may be impossible in existing facilities. A frequency can be calculated by a formula shown in the following Expression 1.

$$f = \frac{1}{2\pi\sqrt{LC}} \qquad (1)$$

f: Frequency
L: Inductance of coil
C: Capacitor capacitance

Therefore, when the coil shape becomes complicated, the inductance of the coil changes greatly. Thus, when the inductance of the coil changes, the coil is not oscillated at an intended output and frequency. Then, it becomes necessary to remodel an existing oscillator.

In the coil as illustrated in FIG. 18, due to the presence of a boundary surface between the solder material and the copper, cracking occurs from the boundary surface when the boundary surface receives self-heating or radiation heat repeatedly, with the result that cooling water leaks and the coil comes to the end of life. Further, a current is likely to be concentrated on a connector 313 313 for connecting the first and second members 311, 312. In this case, there is a boundary surface of a solder material and copper in the connector 313, and cracking is likely to occur to shorten the life of the coil.

SUMMARY OF INVENTION

In view of the above-mentioned problems, it is a first object of the present invention to provide a high-frequency heat treatment coil capable of being assembled with high dimension accuracy and performing high-quality heat treatment, and a method of producing the high-frequency heat treatment coil. Further, it is a second object of the present invention to provide a high-frequency heat treatment coil, an outer joint member for a constant velocity universal joint, and a constant velocity universal joint capable of effectively preventing cracking and the like caused by a self-heating amount. Further, it is a third object of the present invention to provide a constant velocity universal joint subjected to high-quality heat treatment, and a drive shaft and a propeller shaft using the constant velocity universal joint.

Solution to Problem

A first method of producing a high-frequency heat treatment coil of the present invention is a method of producing a high-frequency heat treatment coil including a heating section for heating a heat treatment portion of an outer joint member for a constant velocity universal joint, the method comprising forming the heating section by machining in an integrated manner and joining the heating section to another section, to thereby complete the high-frequency heat treatment coil.

A first high-frequency heat treatment coil of the present invention is a high-frequency heat treatment coil comprising a heating section for heating a heat treatment portion of an outer joint member for a constant velocity universal joint, wherein the heating section is formed by machining in an integrated manner.

In the first high-frequency heat treatment coil of the present invention, joining portions for assembly are provided outside the heating section, and hence the dimension accuracy of the heating section is not degraded due to joining (for example, joining by brazing). That is, a portion required for heating is formed integrally by machine processing, and the influence of deformation and distortion involved in brazing can be suppressed, with the result that an assembled coil can keep high accuracy.

In the first method of producing a high-frequency heat treatment coil, the heating section may comprise a coil body in which a current passage through which a high-frequency current flows is formed, and the method may further comprise forming the coil body by machining in an integrated manner, and joining a cover member serving as the another section to the coil body to form a cooling water passage, to thereby complete the high-frequency heat treatment coil.

Further, in the first high-frequency heat treatment coil of the present invention, the heating section may comprise a coil body in which a current passage through which a high-frequency current flows is formed, the coil body may be formed by machining in an integrated manner, and a cover member may be joined to the coil body to form a cooling water passage.

In the high-frequency heat treatment coil, the coil body in which the current passage through which the high-frequency current flows is formed is formed by machining in an integrated manner. Therefore, the self-heating amount can be reduced, and a boundary surface between the solder material and the copper, which is likely to be an origin for breakage, can be reduced.

It is preferred that a current flowing through a joining section between the cover member and the coil body be set to a minute current, and the joining section be provided outside a position contributing to heating. Further, it is preferred that the current passage of the coil body comprise two passages of a first circumferential passage and a second circumferential passage, and a connecting section between the first circumferential passage and the second circumferential passage be inclined at a predetermined angle with respect to a current flow direction. By setting as described above, the concentration of a current in a corner portion which tends to cause breakage can be alleviated.

The high-frequency heat treatment coil may be used for high-frequency quenching and high-frequency tempering. The high-frequency quenching refers to a quenching method using high-frequency induction heating, which adopts the principle involving supplying a portion required for quenching in a coil through which a high-frequency current is flowing, generating Joule heat by an electromagnetic induction function, and heating a conductive object with the Joule heat. Further, the high-frequency tempering refers to a tempering method using high-frequency induction heating, which involves subjecting a product to induction heating and cooling it with a refrigerant (cooling water, etc.). That is, as the high-frequency heat treatment, it is preferred that, for the purpose of hardening an entire surface or a partial surface of an iron steel product, the iron steel product be heated to an appropriate temperature of Ac3 or Ac1 point or more by induction heating and cooled (quenched) with an appropriate refrigerant, and further for the purpose of adjusting the hardness and increasing the toughness, the resultant be heated to an appropriate temperature of Ac1 point or less in an ordinary tempering furnace and cooled (tempered).

An outer joint member for a constant velocity universal joint of the present invention is subjected to heat treatment through use of the above-mentioned high-frequency heat treatment coil.

The outer joint member for a constant velocity universal joint may be an outer joint member for a tripod type constant velocity universal joint in which three track grooves extending in an axial line direction are provided on an inner circumference thereof, guide surfaces opposed to each other are provided on inner walls of each of the three track grooves, and a large inner diameter section is formed between the guide surfaces.

The outer joint member for a constant velocity universal joint may be an outer joint member for a fixed type constant velocity universal joint including a mouth section in which a track groove to which a ball serving as a torque transmitting member is fitted is formed on an inner surface thereof.

A constant velocity universal joint of the present invention uses the above-mentioned outer joint member for a constant velocity universal joint.

The drive shaft of the present invention uses the above-mentioned constant velocity universal joint, and the propeller shaft of the present invention uses the above-mentioned constant velocity universal joint. The drive shaft is an axle for transmitting a rotative force of an engine from a differential gear to a tire. The propeller shaft refers to a propulsion shaft, which is a rotation shaft extending back and forth in the center of a vehicle body of an FR car and a 4WD car. The propeller shaft transmits a rotative force of an engine to a differential gear and the like.

Advantageous Effects of Invention

In the first high-frequency heat treatment coil of the present invention, the influence of deformation and distortion involved in brazing can be suppressed. Therefore, the assembled coil can keep high accuracy, and a skilled brazing technology is not required. Further, a coil can be assembled in a short period of time, and achieves excellent productivity and low cost. Thus, the first high-frequency heat treatment coil of the present invention is a coil with high accuracy; hence a gap between a heating section which greatly influences heat treatment quality and a portion to be heated can be kept to be a predetermined dimension stably, and high-quality heat treatment can be performed.

In the case where a coil body in which a current passage through which a high-frequency current flows is formed is formed by machining in an integral manner, a self-heating amount can be reduced, and cracking and the like caused by a self-heating amount can be prevented effectively, with the result that long life of the coil can be achieved. Further, the number of components can be reduced as a whole, and the assembly performance can be enhanced.

By setting a current flowing through a joining section between the cover member and the coil body to be a minute current and providing the joining section at a position which does not contribute to heating, a current hardly flows in this section, and the influence of heat of radiation is small, with the result that this section does not serve as an origin for breakage. Therefore, long life of the coil can be achieved stably.

In the current passage of the coil body, the concentration of a current in a corner portion which is likely to cause breakage can be alleviated by setting a connecting section between the first circumferential passage and the second circumferential passage to be inclined at a predetermined angle with respect to a current flow direction.

The high-frequency heat treatment coil can be used for high-frequency quenching and high-frequency tempering and can perform stable high-frequency quenching and high-frequency tempering operation.

Further, the outer joint member for a constant velocity universal joint subjected to heat treatment through use of the high-frequency heat treatment coil of the present invention includes a high-quality thermally hardened layer and serves as an outer joint member excellent in strength. Therefore, the constant velocity universal joint using such an outer joint member is excellent in strength and can exhibit a stable function as a constant velocity universal joint for a long period of time. Further, the drive shaft and the propeller shaft using such a constant velocity universal joint can exhibit a stable function.

DESCRIPTION OF EMBODIMENTS

Now, embodiments of the present invention are described with reference to the drawings.

Figure 2:
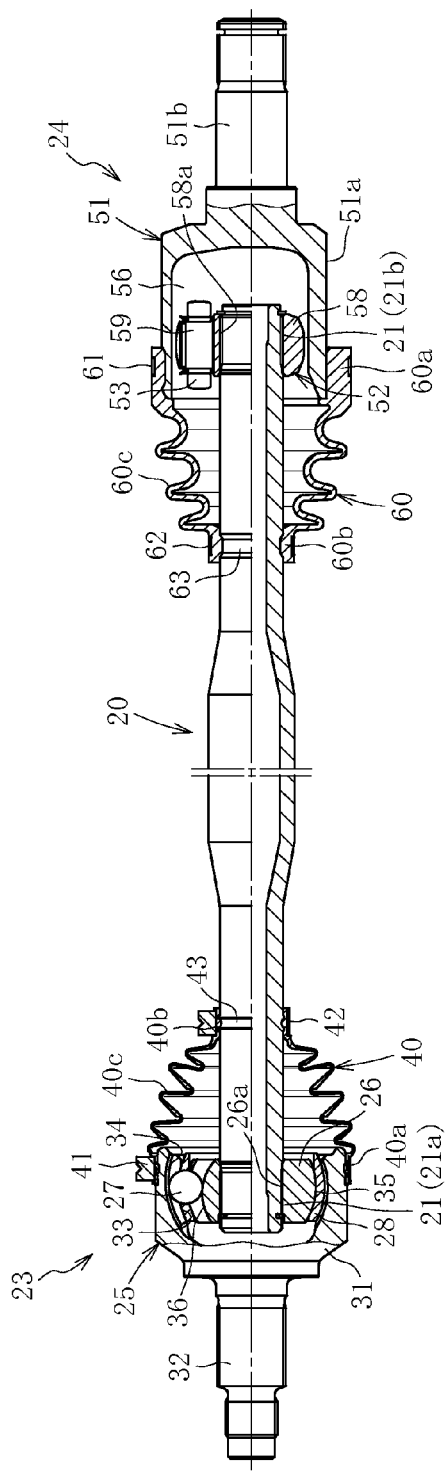
FIG. 2 is a sectional view of a drive shaft using an outer joint member for a constant velocity universal joint subjected to heat treatment through use of the high-frequency heat treatment coil.

FIG. 2 illustrates a drive shaft of the present invention, and the shaft comprises a hollow shaft 20, a fixed type constant velocity universal joint 23 connected to one end portion of the shaft 20, and a plunging type constant velocity universal joint 24 connected to the other end portion of the shaft 20.

The fixed type constant velocity universal joint 23 comprises, as main components, an outer joint member 25, an inner joint member 26, a plurality of balls 27 serving as torque transmitting elements, and a cage 28 for holding the balls 27. Note that, although the fixed type constant velocity universal joint in this case is of a Rzeppa type, other fixed type constant velocity universal joints such as an undercut free type having a linear portion in a groove bottom of a track groove may be used.

The outer joint member 25 comprises a mouth section 31 and a shaft section (stem section) 32. The mouth section 31 has a cup shape opened at one end, and a plurality of track grooves 34 extending in an axial direction are formed at equal intervals in a circumferential direction on a spherical inner circumferential surface (inner spherical surface) 33 thereof.

The inner joint member 26 is connected to the shaft 20 so as to transmit torque by being spline-fitted to a spline 21 in an end portion of the shaft 20 in a spline hole 26a in a shaft center portion. The inner joint member 26 has a spherical outer circumferential surface (outer spherical surface) 35, and a plurality of track grooves 36 extending in an axial direction are formed at equal intervals in a circumferential direction.

The track grooves 34 of the outer joint member 25 and the track grooves 36 of the inner joint member 26 are paired, and one ball 27 is provided so as to roll in a ball track formed by each pair of the track grooves 34, 36. The ball 27 is interposed between the track groove 34 of the outer joint member 25 and the track groove 36 of the inner joint member 26 to transmit torque.

An opening of the mouth section 31 is closed with a boot 40. The boot 40 comprises a large diameter section 40a, a small diameter section 40b, and a bellows section 40c for connecting the large diameter section 40a and the small diameter section 40b to each other. The large diameter section 40a is mounted to the opening of the mouth section 31 to be fastened thereto with a boot band 41. The small diameter section 40b is mounted to a boot mounting section 43 of the shaft 20 to be fastened thereto with a boot band 42.

As the plunging type constant velocity universal joint 24, a tripod type is illustrated herein. However, other plunging type constant velocity universal joints such as a double offset type can also be adopted. The constant velocity universal joint 24 comprises, as main components, an outer joint member 51, a trunnion 52 serving as an inner joint member, and rollers 53 serving as torque transmitting elements.

The outer joint member 51 comprises a mouth section 51a and a stem section 51b and is connected to an output shaft of a final drive gear through the stem section 51b so as to transmit torque. The mouth section 51a has a cup shape opened at one end, and track grooves 56 extending in an axial direction are formed at three equally divided positions in a circumferential direction of an inner circumference thereof. Therefore, the transverse cross-section of the mouth section 51a exhibits a corolla shape.

The trunnion 52 comprises a boss 58 and leg shafts 59 and is connected to the spline 21 of the shaft 20 through a spline hole 58a of the boss 58 so as to transmit torque. The leg shafts 59 protrude in a radial direction from three equally divided positions in a circumferential direction of the boss 58. The roller 53 is supported by each leg shaft 59 so as to rotate.

An opening of the outer joint member 51 is also closed with a boot 60 mounted thereto. The boot 60 comprises a large diameter section 60a, a small diameter section 60b, and a bellows section 60c between the large diameter section 60a and the small diameter section 60b. The large diameter section 60a is mounted to an end portion of the opening of the mouth section 51a to be fastened thereto with a boot band 61, and the small diameter section 60b is mounted to a boot mounting section 63 of the shaft 1 to be fastened thereto with a boot band 62.

Figure 3:
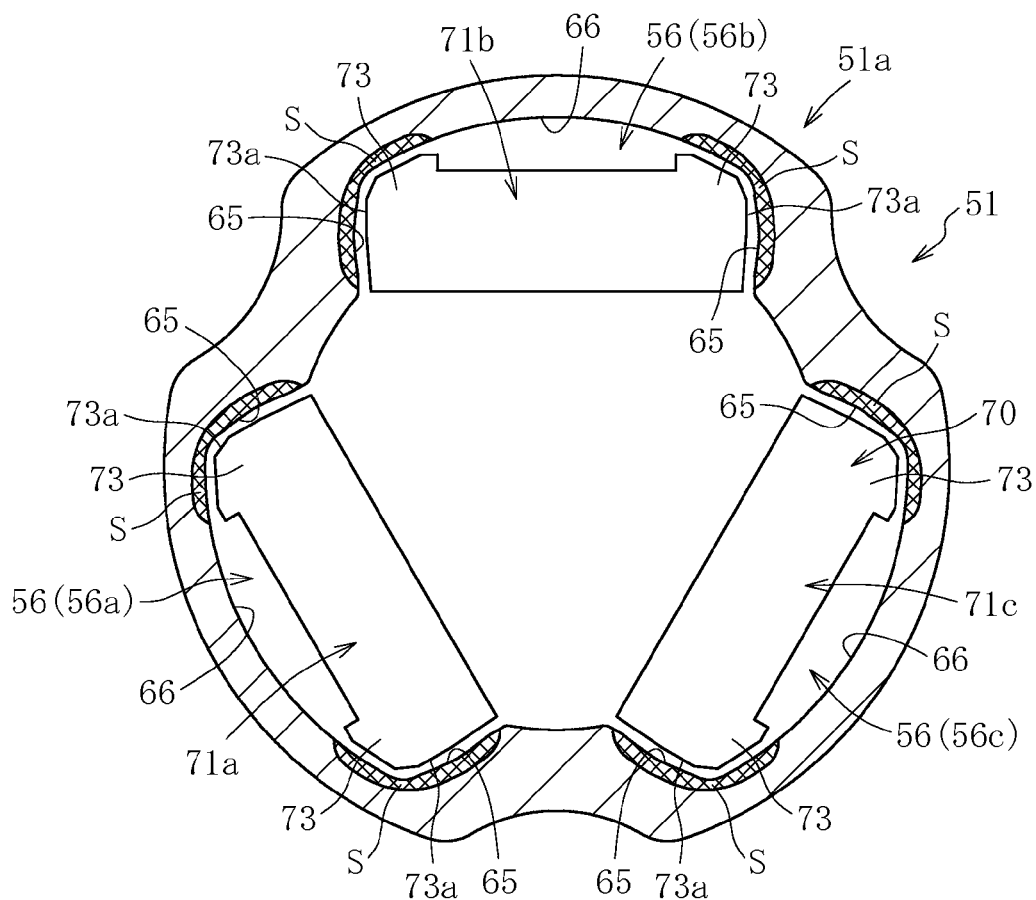
FIG. 3 is a transverse sectional view of the outer joint member for a constant velocity universal joint which is being subjected to heat treatment.

As illustrated in FIG. 3, the track groove 56 of the outer joint member 51 of the plunging type constant velocity universal joint 24 is formed of guide surfaces 65 opposed to each other in a circumferential direction and a large inner diameter section 66 provided between the guide surfaces 65, 65. A hardened layer S is formed on the guide surfaces 65, 65 and in the vicinity of the guide surfaces of the large inner diameter section 66.

Figure 1:
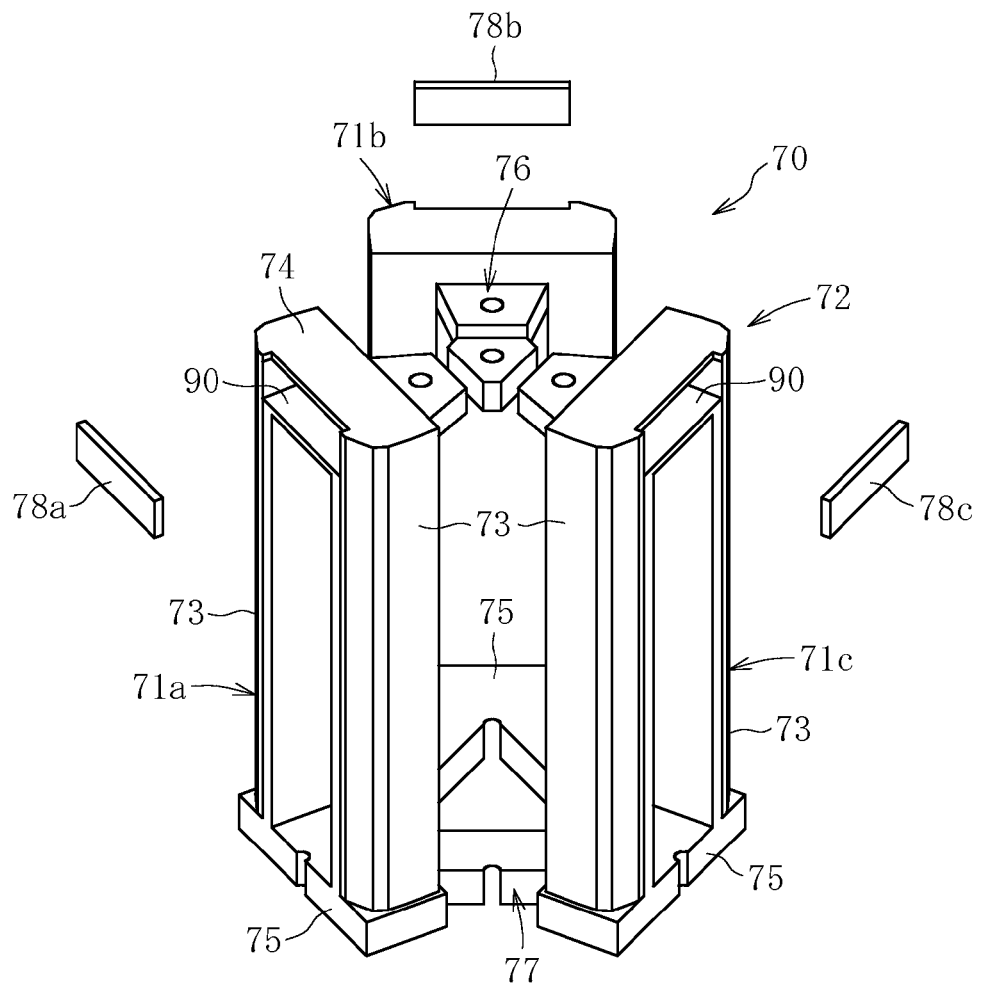
FIG. 1 is a perspective view of each member of a high-frequency heat treatment coil according to a first embodiment of the present invention.
Figure 1:
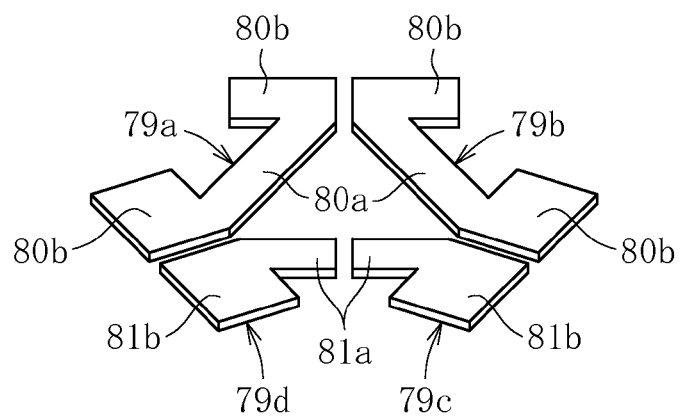

The hardened layer S is formed through use of a high-frequency heat treatment coil 70 as illustrated in FIG. 1. The high-frequency heat treatment coil 70 comprises three heating sections 71a, 71b, 71c, and the heating sections 71a, 71b, 71c are respectively fitted to track grooves 56a, 56b, 56c.

The high-frequency heat treatment coil 70 in this case is obtained by forming a plurality of components and then connecting those components by brazing with silver solder or the like for assembly. The high-frequency heat treatment coil 70 comprises a body section 72 including the heating sections 71a, 71b, 71c.

The heating sections 71a, 71b, 71c each comprise a pair of vertical frames 73, 73, an upper frame 74 for connecting upper portions of the vertical frames 73, 73, and a lower frame 75 for connecting lower portions of the vertical frames 73, 73. Further, in the heating sections 71a, 71b, 71c, the upper frames 74, 74, 74 are connected with an upper connecting frame 76, and the lower frames 75, 75, 75 are connected with a lower connecting frame 77.

The heating sections 71a, 71b, 71c are hollow so that cooling water circulates therein. Each upper frame 74 of the heating sections 71a, 71b, 71c is provided with an opening 90 which is opened outwardly, and the lower connecting frame 77 is provided with an opening (not shown) which is opened downwardly.

Thus, the body section 72 is formed by integrally forming the heating sections 71a, 71b, 71c, the upper frames 74, 74, 74, and the lower frames 75, 75, 75. Further, the upper openings 90 are closed with cover members 78a, 78b, 78c, and the lower openings are closed with cover members 79a, 79b, 79c, 79d. The cover members 78a, 78b, 78c have a rectangular plate shape. The cover members 79a, 79b are each formed of a plate-shaped first section 80a and second sections 80b, 80b which are connected to both end portions of the first section 80a and inclined at a predetermined angle with respect to the first section 80a. Further, the cover members 79c, 79d are each formed of a first section 81a and a second section 81b, and the respective second sections 81b are opposed to the second sections 80b of the cover members 79a, 79b.

Therefore, the coil 70 comprises one body section 72 including the heating sections 71a, 71b, 71c, three cover members 78a, 78b, 78c and four cover members 79a, 79b, 79c, 79d. That is, the coil 70 comprises 8 components.

The body section 72 can be machined in an integrated manner by processing from various angles through use of a machining center having a multiaxial control function. That is, the body section 72 having the heating sections 71a, 71b, 71c can be machined in an integrated manner through use of a machining device which has been known and used publicly.

Thus, the coil 70 can be assembled by joining the heating sections 71a, 71b, 71c, the cover members 78a, 78b, 78c, and the cover members 79a, 79b, 79c, 79d, which have been formed, to each other by brazing with silver solder or the like.

The coil 70 thus assembled has a configuration in which the respective heating sections 71a, 71b, 71c are fitted in the track grooves 56 of the outer joint member 51 as illustrated in FIG. 3. In this case, an outer surface 73a of the vertical frame 73 of each of the heating sections 71a, 71b, 71c is opposed to the guide surface 65 and a part of the large inner diameter section 66 on the guide surface 65 side with a predetermined gap.

Figure 4:
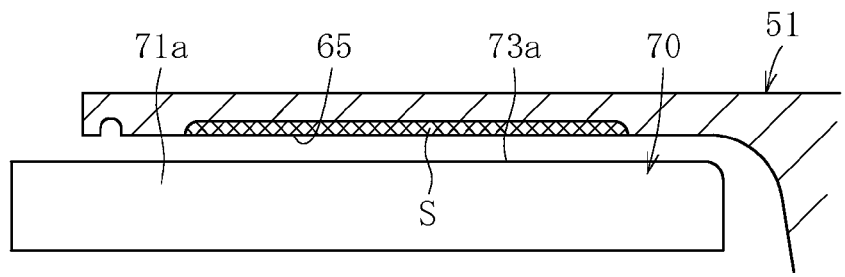
FIG. 4 is an enlarged vertical sectional view of main portions of the outer joint member for a constant velocity universal joint which is being subjected to heat treatment.

A high-frequency current is allowed to flow through the coil 70 in this state, and a portion to be heated is heated to appropriate temperature of Ac3 or Ac1 point or more by induction heating caused by the high-frequency current. After that, the portion to be heated is cooled (quenched) with cooling water, and further heated to appropriate temperature of Ac1 point or less, followed by cooling (quenching). Thus, the hardened layer S can be formed as illustrated in FIGS. 3 and 4.

In this embodiment, the high-frequency heat treatment coil is provided to form the hardened layer S of the outer joint member 51 of the plunging type constant velocity universal joint 24 of the drive shaft. However, the high-frequency heat treatment coil may be provided to form a hardened layer of the outer joint member of the plunging type constant velocity universal joint of a propeller shaft.

In the high-frequency heat treatment coil, joining portions for assembly are located at positions outside the heating sections 71a, 71b, 71c, and hence the dimension accuracy of the heating sections 71a, 71b, 71c is not degraded due to joining (for example, joining by brazing). That is, a portion required for heating is formed integrally by machine processing, and the influence of deformation and distortion involved in brazing can be suppressed, with the result that an assembled coil can keep high accuracy. Therefore, a skilled brazing technology is not required. Further, a coil can be assembled in a short period of time, and achieves excellent productivity with low cost. Thus, the coil of the present invention is a coil with high accuracy; hence a gap between the heating sections 71a, 71b, 71c which greatly influence heat treatment quality and a portion to be heated can be kept to be a predetermined dimension stably, and high-quality heat treatment can be performed.

The high-frequency heat treatment coil can be used for high-frequency quenching and high-frequency tempering and can perform stable high-frequency quenching and high-frequency tempering operation.

Further, the outer joint member for a constant velocity universal joint subjected to heat treatment through use of the high-frequency heat treatment coil comprises the high-quality thermally hardened layer S and serves as the outer joint member excellent in strength. Therefore, the constant velocity universal joint 24 using the outer joint member 51 is excellent in strength, and can exhibit a stable function as the constant velocity universal joint 24 for a long period of time. Further, a drive shaft or a propeller shaft using the constant velocity universal joint 24 can exhibit a stable function.

Figure 5:
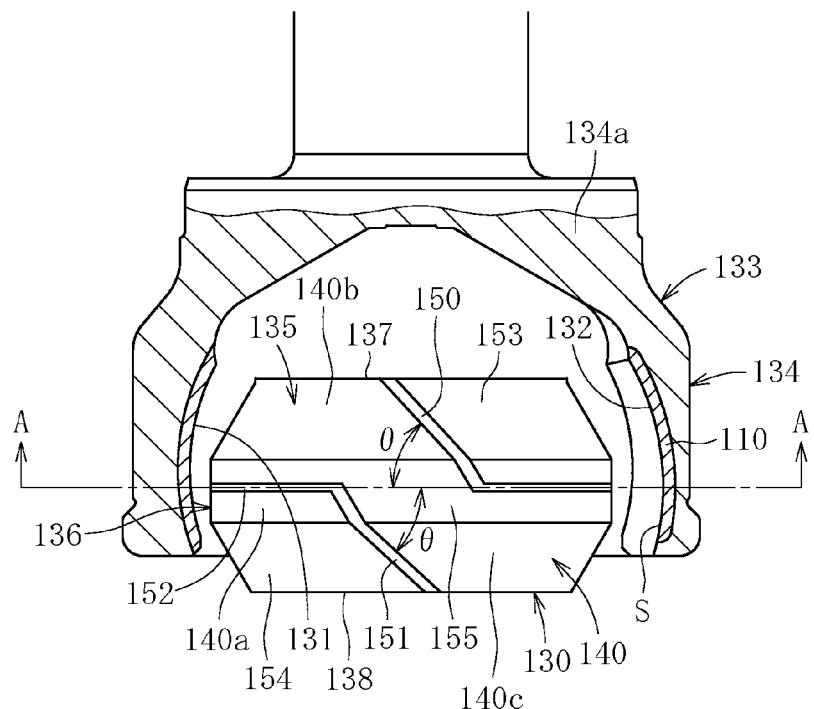
FIG. 5 is an explanatory diagram of a state of heat treatment of an outer joint member for a constant velocity universal joint by a second high-frequency heat treatment coil of the present invention.
Figure 6:
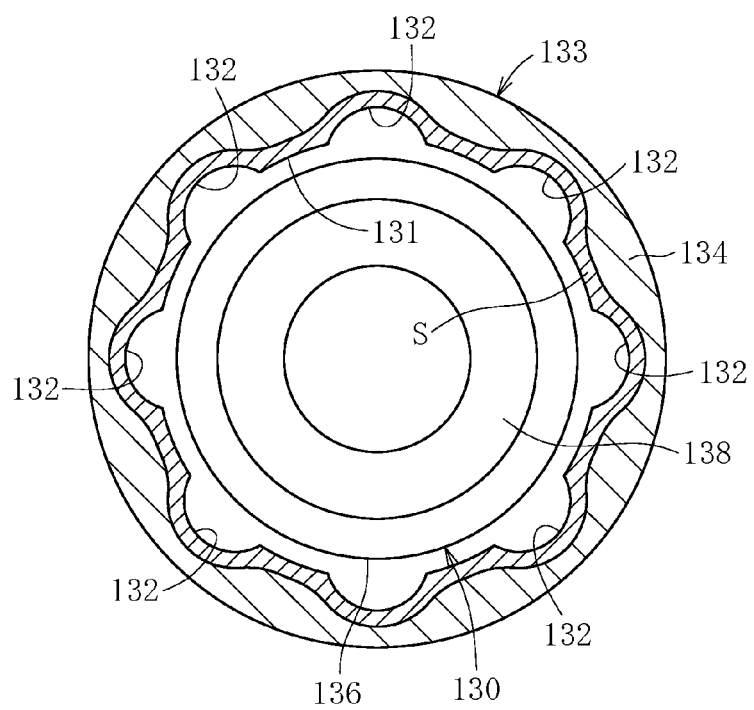
FIG. 6 is a sectional view taken along the line A-A of FIG. 5.
Figure 7:
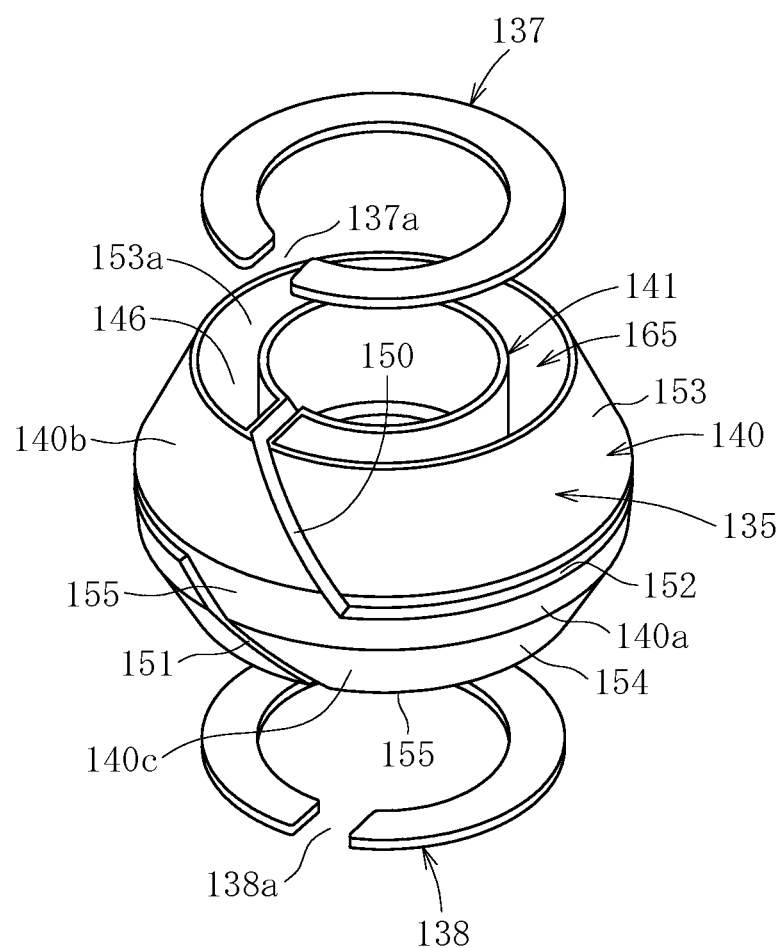
FIG. 7 is an exploded perspective view of a high-frequency heat treatment coil of the present invention.

Next, another embodiment of the present invention is described with reference to FIGS. 5 to 11. FIGS. 5 and 6 illustrate a state of heat treatment of an outer joint member 133 for a constant velocity universal joint by a high-frequency heat treatment coil 130 according to the present invention. FIG. 7 is a perspective view illustrating a separated state of the high-frequency heat treatment coil 130.

The outer joint member 133 comprises a mouth section 134 in which a plurality of guide grooves (track grooves) 132 are formed on an inner surface 131 thereof in an axial direction. A cured surface S is formed on the inner surface 131 including the track grooves 132 by heat treatment performed by the high-frequency heat treatment coil 130.

The high-frequency heat treatment coil 130 comprises a coil body 136 in which a current passage 135 through which a high-frequency current flows is formed and a pair of cover members 137, 138 for closing openings of the coil body 136.

Figure 8A:
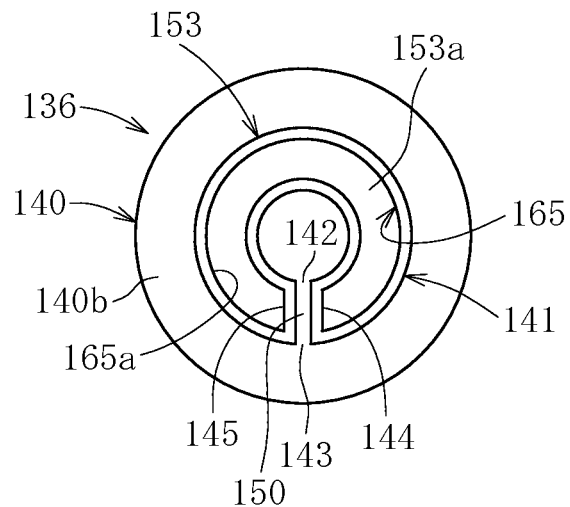
FIG. 8A is a schematic plan view illustrating the high-frequency heat treatment coil of the present invention.
Figure 8B:
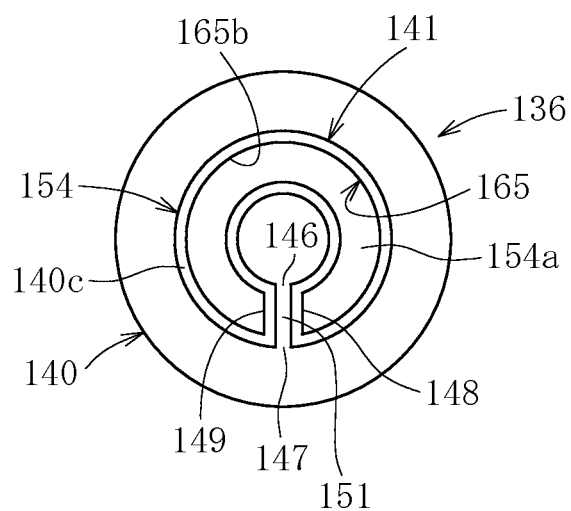
FIG. 8B is a schematic bottom view illustrating the high-frequency heat treatment coil of the present invention.

As illustrated in FIGS. 7, 8A, 8B, and the like, the coil body 136 comprises an outer circumferential wall 140 and an inner circumferential wall 141. The outer circumferential wall 140 comprises a ring-shaped body section 140a corresponding to an intermediate portion in an axial direction, a first cone section 140b whose diameter decreases upwardly from an upper edge of the body section 140a, and a second cone section 140c whose diameter decreases downwardly from a lower edge of the body section 140a. Further, the inner circumferential wall 141 is formed of a cylindrical body.

As illustrated in FIG. 8A, the inner circumferential wall 141 and the first cone section 140b are respectively provided with slits 142, 143, and the slits 142, 143 are connected to each other through connecting pieces 144, 145. Further, as illustrated in FIG. 8B, the inner circumferential wall 141 and the second cone section 140c are respectively provided with slits 146, 147, and the slits 146 and 147 are connected to each other through connecting pieces 148, 149.

Figure 18:
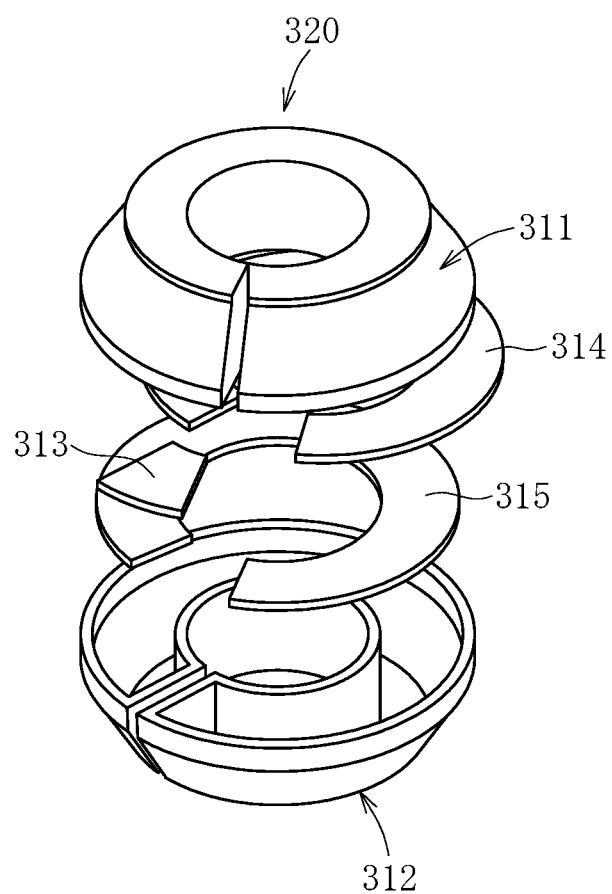
FIG. 18 is an exploded perspective view of the related-art high-frequency heat treatment coil.
Figure 19:
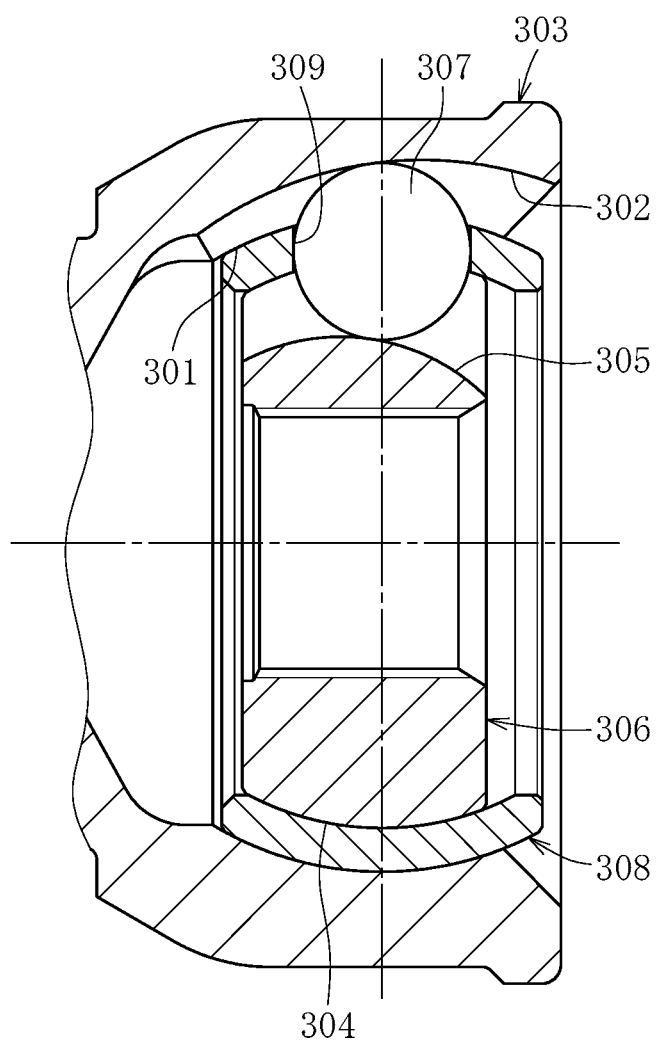
FIG. 19 is a sectional view of a fixed type constant velocity universal joint.

As illustrated in FIG. 7, a gap between the connecting pieces 144, 145 forms a slit section 150 which is inclined at a predetermined angle with respect to an axial center of the coil, and a gap between the connecting pieces 148, 149 forms a slit section 151 which is inclined at a predetermined angle with respect to the axial center of the coil. The slit sections 150, 151 are set so as to be parallel to each other. Further, a partition wall 146 is provided in the body section 140a between the outer circumferential wall 140 and the inner circumferential wall 141, and the slit sections 150 and 151 communicate with a separation slit section 152 formed in the partition wall 146. In this case, the formation of the separation slit section 152 is omitted in a predetermined range between the slit sections 150 and 151. That is, by leaving a remaining portion in the separation slit section 152, the connector 313 of the related-art coil illustrated in FIG. 18 is formed.

Thus, a first circumferential passage 153 comprising a double ring portion extending from the connecting piece 144 to the connecting piece 145 is formed, and a second circumferential passage 154 comprising a double ring portion extending from the connecting piece 148 to the connecting piece 149 is formed. Then, the first circumferential passage 153 and the second circumferential passage 154 are connected through a connecting section 155 between the slit section 150 and the slit section 151.

Specifically, the first circumferential passage 153, the connecting section 155, and the second circumferential passage 154 form a coil-shaped body wound in a so-called spiral shape. Further, a ring-shaped upper opening 153a of the first circumferential passage 153 is closed with the cover member 137, and a ring-shaped lower opening 154a of the second circumferential passage 154 is closed with the cover member 138. Note that, the cover member 137 is provided with a slit 137a which corresponds to a gap between the connecting pieces 144, 145, and the cover member 138 is provided with a slit 138a which corresponds to a gap between the connecting pieces 148, 149. Further, the slit 137a of the cover member 137 forms a cooling water inlet of a cooling water passage 165 (see FIG. 7), and the slit 138a of the cover member 138 forms a cooling water outlet of the cooling water passage 165.

Figure 9A:
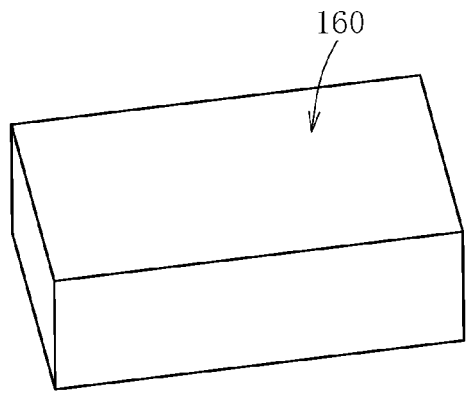
FIG. 9A is a perspective view of a base material, illustrating a method of forming a coil body of a second high-frequency heat treatment coil of the present invention.
Figure 9B:
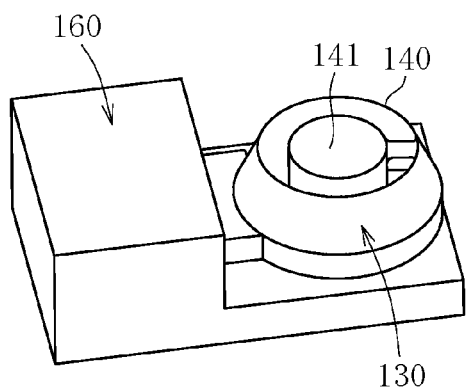
FIG. 9B is a perspective view during machining, illustrating the method of forming the coil body of the second high-frequency heat treatment coil of the present invention.
Figure 9C:
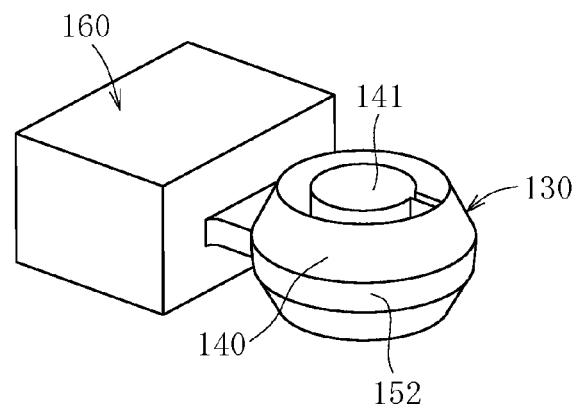
FIG. 9C is a perspective view at the end of machining, illustrating the method of forming the coil body of the second high-frequency heat treatment coil of the present invention.
Figure 10A:
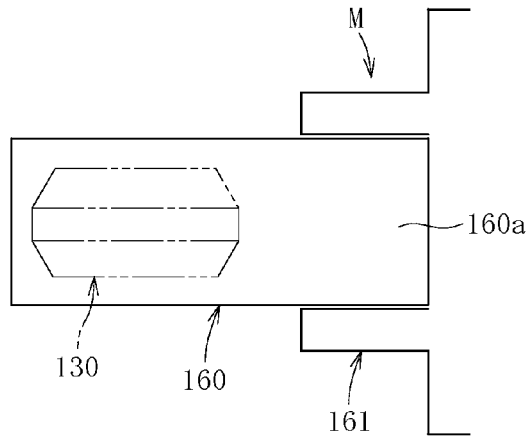
FIG. 10A is a side view of a state in which the base material is held by a machining center, illustrating the method of forming the coil body of the second high-frequency heat treatment coil of the present invention.
Figure 10B:
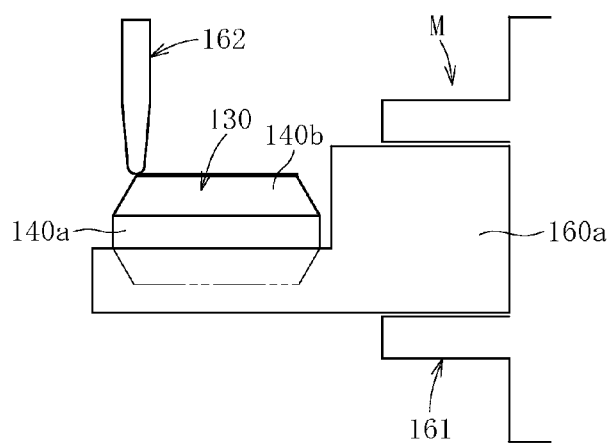
FIG. 10B is a side view during machining, illustrating the method of forming the coil body of the second high-frequency heat treatment coil of the present invention.
Figure 10C:
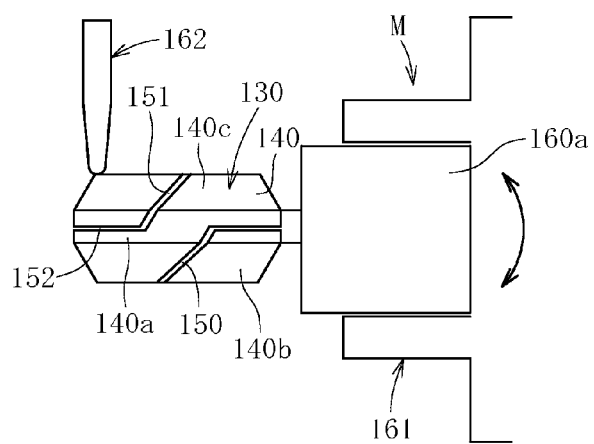
FIG. 10C is a side view at the end of machining, illustrating the method of forming the coil body of the second high-frequency heat treatment coil of the present invention.

As illustrated in FIGS. 9A and 10A, the coil body 136 is formed by machining a copper base material 160 in an integrated manner. In this case, as illustrated in FIG. 10A, a machining center M having a multiaxial control function can be used. The base material 160 is made of a block body having a rectangular cross-section, and as illustrated in FIG. 10A, one end portion 160a is held by a vise 161 of the machining center M. In this case, the base material 160 is disposed with one wide side surface upward. As illustrated in FIGS. 9B and 10B, machining is performed in this state with a machining tool 162. First, the first cone section 140b and the body section 140a of the outer circumferential wall 140, an upper half of the inner circumferential wall 141, the slit section 150, the separation slit section 152, and the like are machined. After that, as illustrated in FIGS. 9C and 10C, the base material 160 is inverted, and the second cone section 140c of the outer circumferential wall 140, a lower half of the inner circumferential wall 141, the slit section 151, and the like are machined. Then, the coil body 136 is completed by being cut away from the end portion 160a of the base material 160.

The cover members 137, 138 which have been separately formed are joined with the thus configured coil body 136 by brazing with silver solder or the like. Consequently, the current passage 135 comprising the first circumferential passage 153, the second circumferential passage 154, and the connecting section 155 is formed, and the cooling water passage 165 is formed in an inner portion, that is, between the outer circumferential wall 140, the inner circumferential wall 141, and the cover members 137, 138. The cooling water passage 165 comprises a first cooling water passage 165a configured in the first circumferential passage 153 and a second cooling water passage 165b configured in the second circumferential passage 154. Note that, an opening hole is provided in the remaining portion (that is, a portion corresponding to the related-art connector 313) of the partition wall 146, and the first cooling water passage 165a and the second cooling water passage 165b communicate with each other.

Next, a heat treatment method using the high-frequency heat treatment coil 130 configured as described above is described. In this case, leads are connected to an upstream end of the first circumferential passage 153 of the current passage 135 and a downstream end of the second circumferential passage 154 of the current passage 135. Further, a cooling water supply path is connected to the first cooling water passage 165a of the cooling water passage 165, and a cooling water discharge path is connected to the second cooling water passage 165b of the cooling water passage 165.

In this state, the high-frequency heat treatment coil 130 is internally fitted in the outer joint member 133 as illustrated in FIG. 5. Then, a high-frequency current is caused to flow to the first circumferential passage 153 of the current passage 135 through the lead. Consequently, the high-frequency current is supplied from the upstream side of the first circumferential passage 153, flows through the first circumferential passage 153 along this passage in a circumferential direction, enters the second circumferential passage 154 through the connecting section 155, flows through the second circumferential passage 154 along this passage in a circumferential direction, and flows out from the second circumferential passage 154 through the lead.

Thus, Joule heat is generated in the high-frequency heat treatment coil 130 by an electromagnetic induction function to heat a portion to be heated (inner surface including the track grooves of the outer joint member 133) of the outer joint member 133. That is, the portion to be heated is heated to an appropriate temperature of Ac3 or Ac1 point or more by induction heating, and thereafter is cooled with cooling water for quenching (quenching). Further, the portion to be heated is heated to an appropriate temperature of Ac1 point or less, and thereafter is cooled (tempering). Consequently, as illustrated in FIGS. 5 and 6, the hardened layer S can be formed. Note that, the cooling water is caused to flow to the first cooling water passage 165a through the cooling water supply path and flow out from the second cooling water passage 165b to the cooling water discharge path.

As illustrated in FIG. 5, the cover member 137 is opposed to a bottom wall 134a of the mouth section 134, and the cover member 138 is disposed outside of the opening of the mouth section 134. Therefore, it is not necessary to heat the portion to be heated at the cover members 137, 138 and connecting sections therefor. Thus, a current flowing through a joining section between the cover members 137, 138 and the coil body 136 can be set to a minute current.

In the high-frequency heat treatment coil 130 illustrated in FIGS. 5 to 7 and the like, the coil body 136 in which a current passage through which a high-frequency current flows is formed by machining in an integrated manner, and hence self-heating amount may be small. Further, the boundary surface between the solder material and the copper can be reduced. Therefore, cracking and the like caused by self-heating amount can be prevented effectively, and the life of the coil can be extended. Further, the number of components can be reduced as a whole, and assembly performance can be enhanced.

By setting a current flowing through the joining section between the cover members 137, 138 and the coil body 136 to be a minute current and providing the joining section at a position which does not contribute to heating as illustrated in FIG. 1, a current hardly flows through this section and the influence of radiation heat is small, with the result that this section does not serve as an origin for breakage. Therefore, the life of the coil can be extended stably.

Figure 11A:
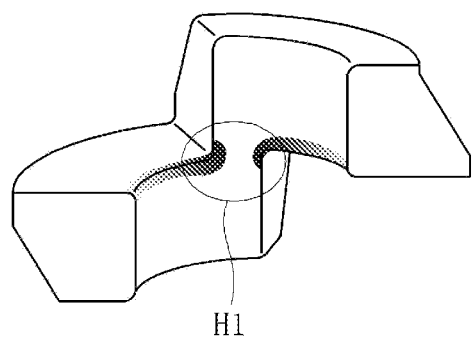
FIG. 11A is a visualized model view of a related-art high-frequency heat treatment coil, illustrating current density when a high-frequency current is flowing.
Figure 11B:
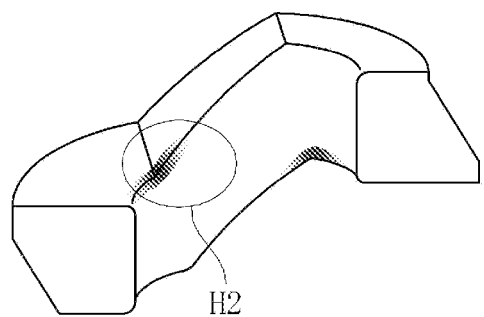
FIG. 11B is a visualized model view of a high-frequency heat treatment coil of the present invention, illustrating current density when a high-frequency current is flowing.
Figure 12:
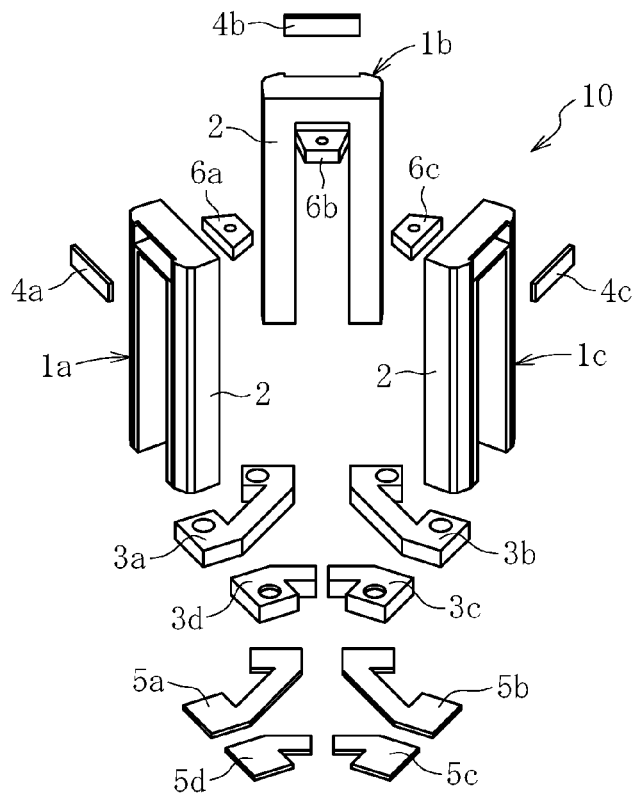
FIG. 12 is a perspective view of each member of a related-art high-frequency heat treatment coil.
Figure 13:
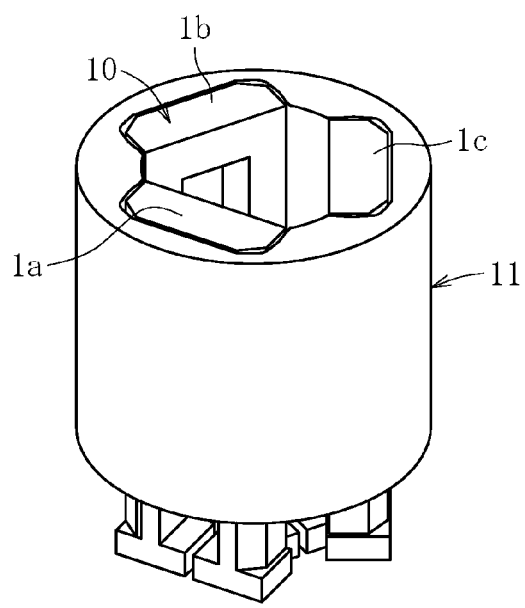
FIG. 13 is a perspective view illustrating an assembled state of the related-art high-frequency heat treatment coil.
Figure 14:
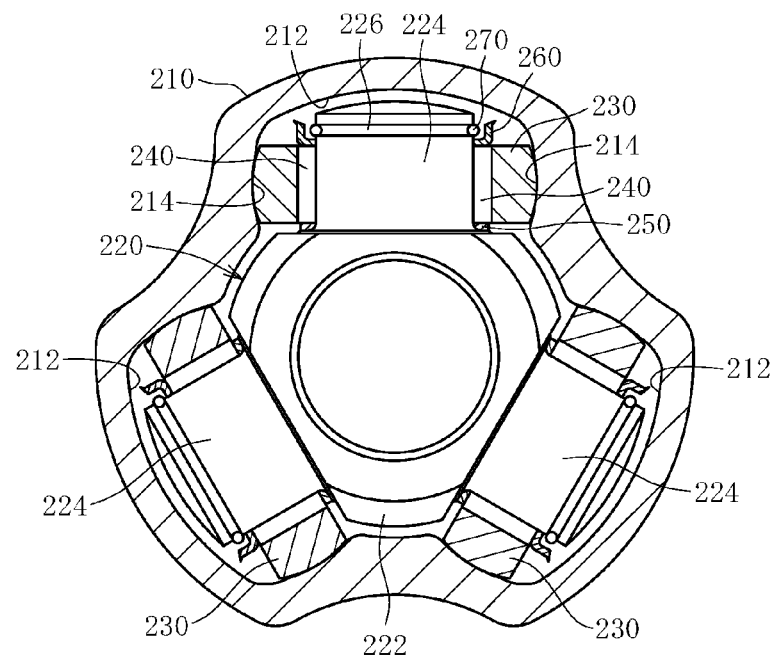
FIG. 14 is a transverse sectional view of a tripod type constant velocity universal joint.
Figure 15:
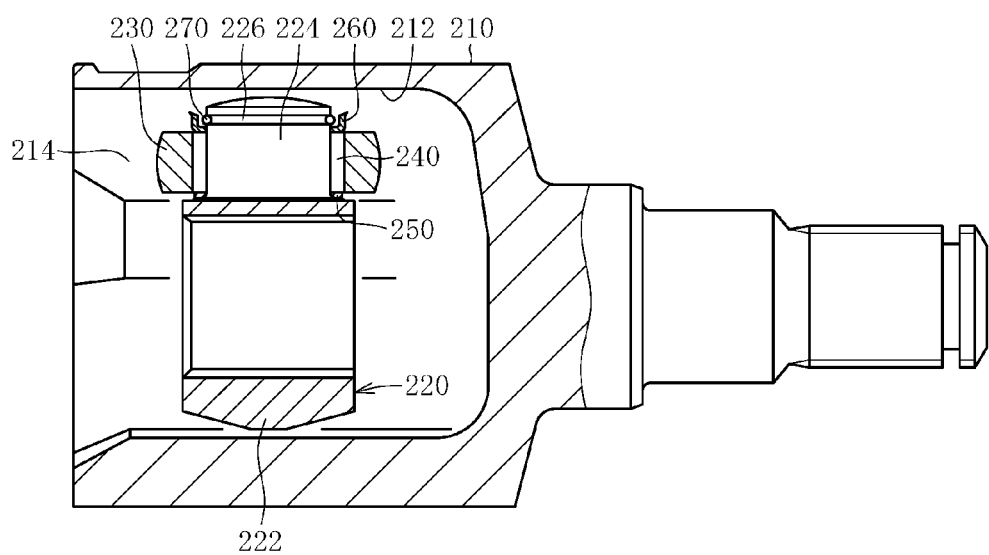
FIG. 15 is a vertical sectional view of the tripod type constant velocity universal joint.
Figure 16:
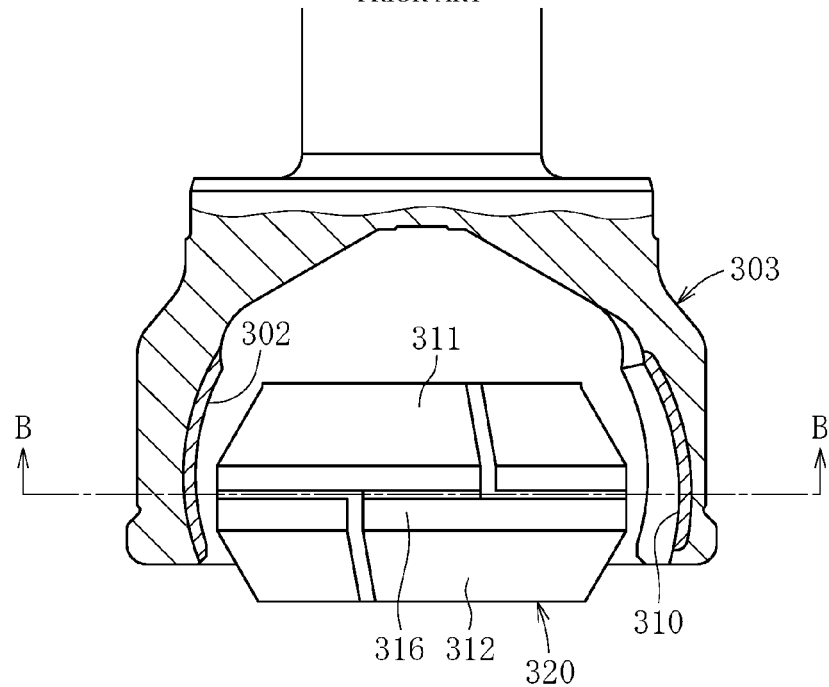
FIG. 16 is an explanatory diagram of a state of heat treatment of an outer joint member for a constant velocity universal joint by another related-art high-frequency heat treatment coil.
Figure 17:
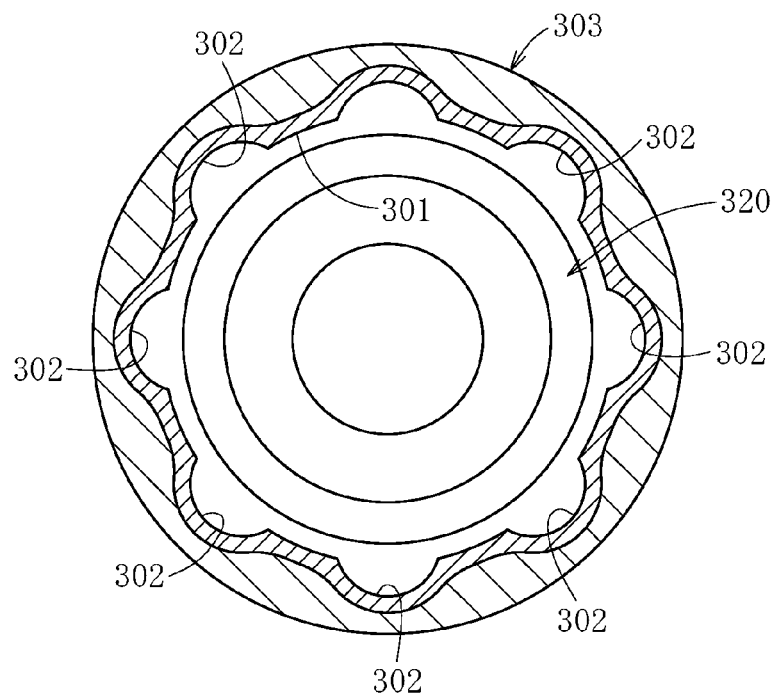
FIG. 17 is a sectional view taken along the line B-B of FIG. 16.

When a connecting section 116 between a first member 111 and a second member 112 is orthogonal to a current flow direction as in the related art, the concentration of current density is recognized in a corner portion of the connecting section 116, as illustrated in a range H1 of FIG. 11A.

In contrast, in the coil of this embodiment, the current passage 135 of the coil body 136 is set so that the connecting section 155 between the first circumferential passage 153 and the second circumferential passage 154 is inclined at a predetermined angle θ with respect to a current flow direction. Therefore, as illustrated in a range H2 of FIG. 11B, the concentration of a current in a corner portion which is likely to cause breakage can be alleviated. An inclination angle θ of the connecting section 155 in this case is set to, for example, about 30° to about 70°. That is, it is only required that the concentration of a current in a corner portion which is likely to cause breakage may be alleviated.

Even the high-frequency treatment coil 130 illustrated in FIGS. 5 to 7 and the like can be used for high-frequency quenching and high-frequency tempering and is capable of performing stable high-frequency quenching and tempering operation.

Further, the outer joint member 133 for a constant velocity universal joint subjected to heat treatment through use of the high-frequency heat treatment coil 130 illustrated in FIGS. 5 to 7 and the like includes a high-quality thermally hardened layer and serves as the outer joint member 133 excellent in strength. Therefore, the constant velocity universal joint using such an outer joint member is excellent in strength and can exhibit a stable function of a constant velocity universal joint for a long period of time.

Although the embodiments of the present invention have been described above, the present invention can be variously modified without being limited to the above-mentioned embodiments. For example, the material for a frequency heat treatment coil is not limited to copper. In the case of assembling a high-frequency heat treatment coil, silver brazing is used in the above-mentioned embodiments; however, if possible, other brazing such as copper brazing, brass brazing, and phosphor copper brazing may be used depending on a material to be used. Although a single roller type is used as the tripod type constant velocity universal joint in the above-mentioned embodiments, a double roller type may be used. Further, the fixed type constant velocity universal joint is not limited to a Rzeppa type, and an undercut free type fixed type constant velocity universal joint may be used. Further, the fixed type constant velocity universal joint may be used for a propeller shaft or a drive shaft. Further, the number of track grooves of the outer joint member is not limited to eight.

Further, although a high-frequency current is caused to flow from the first circumferential passage 153 side in the above-mentioned embodiments, the high-frequency current may be caused to flow from the second circumferential passage 154 side. Cooling water may also be caused to flow from the second cooling water passage 165b side instead of from the first cooling water passage 165a side. Further, the high-frequency current flow direction and the cooling water flow direction may be the same or opposite.

INDUSTRIAL APPLICABILITY

The high-frequency heat treatment coil of the present invention can be assembled with high dimension accuracy and can perform high-quality heat treatment. The constant velocity universal joint subjected to high-quality heat treatment, and the drive shaft and the propeller shaft using the constant velocity universal joint can be further provided.

REFERENCE SIGNS LIST 51 outer joint member
56 track groove
66 large inner diameter section
70 high-frequency heat treatment coil
71a, 71b, 71c heating section
130 high-frequency heat treatment coil
131 inner surface
132 track groove
133 outer joint member
134 mouth section
134a bottom wall
135 current passage
137 cover member
138 cover member
153 circumferential passage
153a upper opening
154a lower opening
154 circumferential passage
155 connecting section
165 cooling water passage
165a cooling water passage
165b cooling water passage

The invention claimed is:
1. A method of producing a high-frequency heat treatment coil including a heating section for heating a heat treatment portion of an outer joint member for a constant velocity universal joint, wherein:
the heating section comprises a coil body in which a current passage through which a high-frequency current flows is formed, the coil body being formed by machining in an integrated manner;
a cover member is joined to the coil body to form a cooling water passage;
the current passage of the coil body comprises two passages of a first circumferential passage and a second circumferential passage, and a connecting section between the first circumferential passage and the second circumferential passage is inclined at a predetermined angle with respect to a current flow direction; and
the method comprises: forming the heating section comprising the coil body by machining in the integrated manner; and joining the cover member serving as another section to the coil body to form the cooling water passage, to thereby complete the high-frequency heat treatment coil.

2. A method of producing a high-frequency heat treatment coil including a heating section for heating a heat treatment portion of an outer joint member for a constant velocity universal joint, wherein:
- the heating section comprises a coil body in which a current passage through which a high-frequency current flows is formed, the coil body being formed by machining in an integrated manner;
- a cover member is joined to the coil body to form a cooling water passage;
- a current flowing through a joining section between the cover member and the coil body is set to a minute current, the joining section being disposed at a position independent of contributing to heating;
- the current passage of the coil body comprises two passages of a first circumferential passage and a second circumferential passage, and a connecting section between the first circumferential passage and the second circumferential passage is inclined at a predetermined angle with respect to a current flow direction; and
- the method comprises: forming the heating section comprising the coil body by machining in the integrated manner; and joining the cover member serving as another section to the coil body to form the cooling water passage, to thereby complete the high-frequency heat treatment coil.

* * * * *